(12) United States Patent
Bennett et al.

(10) Patent No.: US 8,170,912 B2
(45) Date of Patent: May 1, 2012

(54) DATABASE STRUCTURE AND FRONT END

(75) Inventors: Dominic Bennett, Los Altos, CA (US); Dan Hu, Cupertino, CA (US)

(73) Assignee: Carhamm Ltd., LLC, Dover, DE (US)

( * ) Notice: Subject to any disclaimer, the term of this patent is extended or adjusted under 35 U.S.C. 154(b) by 1305 days.

(21) Appl. No.: 10/721,117

(22) Filed: Nov. 25, 2003

(65) Prior Publication Data

US 2005/0114206 A1 May 26, 2005

(51) Int. Cl.
*G06Q 30/00* (2006.01)
(52) U.S. Cl. .................. 705/14.4; 707/778; 707/807
(58) Field of Classification Search ............ 705/14.4; 707/778, 807
See application file for complete search history.

(56) References Cited

U.S. PATENT DOCUMENTS

| | | |
|---|---|---|
| 4,977,594 A | 12/1990 | Shear |
| 5,247,517 A | 9/1993 | Ross et al. |
| 5,315,580 A | 5/1994 | Phaal |
| 5,446,919 A | 8/1995 | Wilkins |
| 5,481,741 A | 1/1996 | McKaskle et al. |
| 5,608,850 A | 3/1997 | Robertson |
| 5,617,526 A | 4/1997 | Oran et al. |
| 5,627,886 A | 5/1997 | Bowman |
| 5,638,443 A | 6/1997 | Stefik et al. |
| 5,642,484 A | 6/1997 | Harrison, III et al. |
| 5,675,510 A | 10/1997 | Coffey et al. |
| 5,682,525 A | 10/1997 | Bouve et al. |
| 5,706,502 A | 1/1998 | Foley et al. |
| 5,708,709 A | 1/1998 | Rose |
| 5,708,780 A | 1/1998 | Levergood et al. |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,724,567 A | 3/1998 | Rose et al. |
| 5,734,863 A | 3/1998 | Kodosky et al. |
| 5,745,681 A | 4/1998 | Levine et al. |
| 5,751,956 A | 5/1998 | Kirsch |
| 5,754,938 A | 5/1998 | Herz et al. |
| 5,758,111 A | 5/1998 | Shiratori et al. |

(Continued)

FOREIGN PATENT DOCUMENTS

EP 0822535 2/1998

(Continued)

OTHER PUBLICATIONS

Dialog file 15 #00936299 by Rosemary Cafasso "Multidimensional DB on Comeback Trail" Computerworld V28n43 pp. 69, Oct. 24, 1994.*

(Continued)

*Primary Examiner* — Raquel Alvarez
(74) *Attorney, Agent, or Firm* — Brundidge & Stanger, P.C.

(57) ABSTRACT

In one embodiment, a method of analyzing online advertising information includes the steps of receiving consumer data from client computers, creating a database based on the consumer data, receiving user selected values from a front end, and extracting data from the database based on the user selected values. The front end may have a selection area with user selectable values that change depending on an initially selected value. In one embodiment, the database comprises an online analytical processing (OLAP) database.

19 Claims, 9 Drawing Sheets

U.S. PATENT DOCUMENTS

| | | |
|---|---|---|
| 5,761,662 A | 6/1998 | Dasan |
| 5,787,253 A | 7/1998 | McCreery et al. |
| 5,794,210 A | 8/1998 | Goldhaber et al. |
| 5,794,259 A | 8/1998 | Kikinis |
| 5,796,952 A | 8/1998 | Davis et al. |
| 5,809,242 A | 9/1998 | Shaw et al. |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,722 A | 11/1998 | Bradshaw et al. |
| 5,848,396 A | 12/1998 | Gerace |
| 5,854,897 A | 12/1998 | Radziewicz et al. |
| 5,872,850 A | 2/1999 | Klein et al. |
| 5,875,296 A | 2/1999 | Shi et al. |
| 5,883,955 A | 3/1999 | Ronning |
| 5,887,133 A | 3/1999 | Brown et al. |
| 5,893,118 A | 4/1999 | Sonderegger |
| 5,898,434 A | 4/1999 | Small et al. |
| 5,901,287 A | 5/1999 | Bull et al. |
| 5,905,492 A | 5/1999 | Straub et al. |
| 5,918,014 A | 6/1999 | Robinson |
| 5,920,697 A | 7/1999 | Masters et al. |
| 5,923,845 A | 7/1999 | Kamiya et al. |
| 5,930,700 A | 7/1999 | Pepper et al. |
| 5,933,811 A | 8/1999 | Angles et al. |
| 5,937,037 A | 8/1999 | Kamel et al. |
| 5,943,478 A | 8/1999 | Aggarwal et al. |
| 5,948,061 A | 9/1999 | Merriman et al. |
| 5,958,015 A | 9/1999 | Dascalu |
| 5,959,621 A | 9/1999 | Nawaz et al. |
| 5,961,593 A | 10/1999 | Gabber et al. |
| 5,963,915 A | 10/1999 | Kirsch |
| 5,978,836 A | 11/1999 | Ouchi |
| 5,987,606 A | 11/1999 | Cirasole et al. |
| 5,991,735 A | 11/1999 | Gerace |
| 5,995,597 A | 11/1999 | Woltz et al. |
| 5,996,011 A | 11/1999 | Humes |
| 5,999,740 A | 12/1999 | Rowley |
| 6,006,252 A | 12/1999 | Wolfe |
| 6,009,410 A | 12/1999 | LeMole et al. |
| 6,011,537 A | 1/2000 | Slotznick |
| 6,014,502 A | 1/2000 | Moraes |
| 6,014,638 A | 1/2000 | Burge et al. |
| 6,014,711 A | 1/2000 | Brown |
| 6,026,368 A | 2/2000 | Brown et al. |
| 6,026,933 A | 2/2000 | King et al. |
| 6,029,141 A | 2/2000 | Bezos et al. |
| 6,029,195 A | 2/2000 | Herz |
| 6,047,327 A | 4/2000 | Tso et al. |
| 6,052,709 A | 4/2000 | Paul |
| 6,052,730 A | 4/2000 | Felciano et al. |
| 6,065,056 A | 5/2000 | Bradshaw et al. |
| 6,067,561 A | 5/2000 | Dillon |
| 6,070,140 A | 5/2000 | Tran |
| 6,073,105 A | 6/2000 | Sutcliffe et al. |
| 6,073,241 A | 6/2000 | Rosenberg et al. |
| 6,076,166 A | 6/2000 | Moshfeghi et al. |
| 6,078,916 A | 6/2000 | Culliss |
| 6,088,731 A | 7/2000 | Kiraly et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,115,680 A | 9/2000 | Coffee et al. |
| 6,119,098 A | 9/2000 | Guyot et al. |
| 6,122,632 A | 9/2000 | Botts et al. |
| 6,128,663 A | 10/2000 | Thomas |
| 6,133,912 A | 10/2000 | Montero |
| 6,133,918 A | 10/2000 | Conrad et al. |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyle |
| 6,144,944 A | 11/2000 | Kurtzman, II et al. |
| 6,151,596 A | 11/2000 | Hosomi |
| 6,154,738 A | 11/2000 | Call |
| 6,161,112 A | 12/2000 | Cragun et al. |
| 6,163,778 A | 12/2000 | Fogg et al. |
| 6,182,097 B1 | 1/2001 | Hansen et al. |
| 6,183,366 B1 | 2/2001 | Goldberg et al. |
| 6,185,614 B1 | 2/2001 | Cuomo et al. |
| 6,192,380 B1 | 2/2001 | Light et al. |
| 6,199,079 B1 | 3/2001 | Gupta et al. |
| 6,208,339 B1 | 3/2001 | Atlas et al. |
| 6,216,111 B1 | 4/2001 | Walker et al. |
| 6,216,141 B1 | 4/2001 | Straub et al. |
| 6,222,520 B1 | 4/2001 | Gerszberg et al. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,266,058 B1 | 7/2001 | Meyer |
| 6,269,361 B1 | 7/2001 | Davis et al. |
| 6,285,987 B1 | 9/2001 | Roth et al. |
| 6,286,043 B1 | 9/2001 | Cuomo et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schena et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,742 B2 | 4/2002 | Forbes et al. |
| 6,385,592 B1 | 5/2002 | Angles et al. |
| 6,392,668 B1 | 5/2002 | Murray |
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,434,745 B1 | 8/2002 | Conley, Jr. et al. |
| 6,438,215 B1 | 8/2002 | Skladman et al. |
| 6,438,578 B1 | 8/2002 | Schmid et al. |
| 6,438,579 B1 | 8/2002 | Hosken |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |

| | | |
|---|---|---|
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,490,722 B1 | 12/2002 | Barton et al. |
| 6,493,702 B1 | 12/2002 | Adar et al. |
| 6,496,931 B1 | 12/2002 | Rajchel et al. |
| 6,502,076 B1 | 12/2002 | Smith |
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,529,903 B2 | 3/2003 | Smith et al. |
| 6,539,375 B2 | 3/2003 | Kawasaki |
| 6,539,424 B1 | 3/2003 | Dutta |
| 6,564,202 B1 | 5/2003 | Schuetze et al. |
| 6,567,850 B1 | 5/2003 | Freishtat et al. |
| 6,567,854 B1 | 5/2003 | Olshansky et al. |
| 6,570,595 B2 | 5/2003 | Porter |
| 6,584,492 B1 | 6/2003 | Cezar et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,615,247 B1 | 9/2003 | Murphy |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,694,322 B2 * | 2/2004 | Warren et al. .......................... 1/1 |
| 6,697,825 B1 | 2/2004 | Underwood et al. |
| 6,701,362 B1 | 3/2004 | Subramonian et al. |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,795 B1 | 4/2004 | Eldreth |
| 6,725,269 B1 | 4/2004 | Megiddo |
| 6,741,967 B1 | 5/2004 | Wu et al. |
| 6,748,427 B2 | 6/2004 | Drosset et al. |
| 6,757,661 B1 | 6/2004 | Blaser et al. |
| 6,760,746 B1 | 7/2004 | Schneider |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,847,992 B1 | 1/2005 | Haitsuka et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman et al. |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 7,039,599 B2 | 5/2006 | Merriman et al. |
| 7,043,526 B1 | 5/2006 | Wolfe |
| 7,054,900 B1 | 5/2006 | Goldston |
| 7,076,546 B1 | 7/2006 | Bates et al. |
| 7,085,682 B1 | 8/2006 | Heller et al. |
| 7,100,111 B2 | 8/2006 | McElfresh et al. |
| 7,111,010 B2 | 9/2006 | Chen |
| 7,136,875 B2 | 11/2006 | Anderson et al. |
| 7,162,739 B2 | 1/2007 | Cowden et al. |
| 7,181,415 B2 | 2/2007 | Blaser et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,512,603 B1 | 3/2009 | Veteska et al. |
| 7,610,213 B2 * | 10/2009 | Jones et al. ..................... 705/8 |
| 7,716,173 B2 | 5/2010 | Stolte et al. |
| 7,844,488 B2 | 11/2010 | Merriman et al. |
| 2001/0030970 A1 | 10/2001 | Wiryaman et al. |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0010626 A1 | 1/2002 | Agmoni |
| 2002/0016736 A1 | 2/2002 | Cannon et al. |
| 2002/0019834 A1 | 2/2002 | Vilcauskas, Jr. et al. |
| 2002/0023159 A1 | 2/2002 | Vange et al. |
| 2002/0032592 A1 | 3/2002 | Krasnick et al. |
| 2002/0038363 A1 | 3/2002 | MacLean |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0055912 A1 | 5/2002 | Buck |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0091700 A1 | 7/2002 | Steele et al. |
| 2002/0094868 A1 | 7/2002 | Tuck et al. |
| 2002/0099605 A1 | 7/2002 | Weitzman et al. |
| 2002/0099824 A1 | 7/2002 | Bender et al. |
| 2002/0107847 A1 | 8/2002 | Johnson |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128925 A1 | 9/2002 | Angeles |
| 2002/0152121 A1 | 10/2002 | Hiroshi |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0171682 A1 | 11/2002 | Frank et al. |
| 2002/0175947 A1 | 11/2002 | Conrad et al. |

| | | |
|---|---|---|
| 2002/0194151 A1 | 12/2002 | Fenton et al. |
| 2003/0005067 A1 | 1/2003 | Martin et al. |
| 2003/0005134 A1 | 1/2003 | Martin et al. |
| 2003/0014399 A1 | 1/2003 | Hansen et al. |
| 2003/0018778 A1 | 1/2003 | Martin et al. |
| 2003/0023481 A1 | 1/2003 | Calvert et al. |
| 2003/0023698 A1 | 1/2003 | Dieberger et al. |
| 2003/0024419 A1 | 1/2003 | Weisman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0074448 A1 | 4/2003 | Kinebuchi et al. |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0195877 A1 | 10/2003 | Ford et al. |
| 2003/0208472 A1 | 11/2003 | Pham |
| 2003/0221167 A1 | 11/2003 | Goldstein et al. |
| 2004/0002896 A1 | 1/2004 | Alanen et al. |
| 2004/0024756 A1 | 2/2004 | Rickard |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0133845 A1 | 7/2004 | Forstall et al. |
| 2004/0163101 A1 | 8/2004 | Swix et al. |
| 2004/0167926 A1 | 8/2004 | Anderson et al. |
| 2004/0167928 A1 | 8/2004 | Anderson et al. |
| 2004/0181525 A1 | 9/2004 | Itzhak et al. |
| 2004/0193488 A1 | 9/2004 | Khoo et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027822 A1 | 2/2005 | Plaza |
| 2005/0033657 A1 | 2/2005 | Herrington et al. |
| 2005/0080772 A1 | 4/2005 | Bem |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0125382 A1 | 6/2005 | Karnawat et al. |
| 2005/0131762 A1 | 6/2005 | Bharat et al. |
| 2005/0149404 A1 | 7/2005 | Barnett et al. |
| 2005/0182773 A1 | 8/2005 | Feinsmith |
| 2005/0187823 A1 | 8/2005 | Howes |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0273463 A1 | 12/2005 | Zohar et al. |
| 2006/0015390 A1 | 1/2006 | Rijsinghani et al. |
| 2006/0031253 A1 | 2/2006 | Newbold et al. |
| 2006/0136524 A1 | 6/2006 | Wohlers et al. |

FOREIGN PATENT DOCUMENTS

| | | |
|---|---|---|
| EP | 1045547 | 10/2000 |
| EP | 1154611 | 11/2001 |
| EP | 1207468 | 5/2002 |
| JP | 11066099 | 3/1999 |
| JP | 2001084256 | 3/2001 |
| JP | 20010222535 | 8/2001 |
| JP | 2002024221 | 1/2002 |
| JP | 2002032401 | 1/2002 |
| JP | 2002073545 | 3/2002 |
| JP | 2002259371 | 9/2002 |
| JP | 2002334104 | 11/2002 |
| JP | 2003058572 | 2/2003 |
| JP | 2003141155 | 5/2003 |
| JP | 2003178092 | 6/2003 |
| JP | 20030271647 | 9/2003 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/063472 | 8/2001 |
| WO | WO 01/69929 | 9/2001 |
| WO | WO 01/90917 | 11/2001 |
| WO | WO 03/010685 | 2/2003 |

OTHER PUBLICATIONS

PCT International Search Report for International Application No. PCT/US03/34015. (3 sheets).

Hancock, Wayland, A New Way To Get Information From The Internet, American Agent & Broker; Nov. 1997; 69, 11; ABI/INFORM Global, pp. 64 & 66.

Nilsson, B.A., Invasion of the Webcasters, PC World, Sep. 1997, pp. 205-216.

Netcaster Developer's Guide, Netscape Communicator, Sep. 25, 1997, pp. 1-112.

BackWeb User's Guide, about 1997/1998, pp. 1-48.

BackWeb Technologies Ltd., BackWEB User's Guide, 1997, [48 pgs.].

EPO Communication in European Appln. No. 04795209, mailed Feb. 17, 2011 [160 pages].

EPO Communication in European Appln. No. 04795209, mailed Feb. 17, 2011 [4 pages].

EPO File History of EP 2004795209, downloaded from European Patent Office on Apr. 13, 2011 [164 pgs.].

Hancock, Wayland, "A new way to get information from the Internet," American Agent & Broker, Nov. 1997, 69, 11, pp. 65-66 [2 pgs.].

International Search Report in PCT Appln. No. PCT/US2005/035352, mailed Sep. 11, 2007.

Japanese Patent Office, Official Action issued Dec. 17, 2010, mailed Dec. 27, 2010 in Japanese Patent Application No. 2007-528053 (non-official translation), 7 pgs.

KIPO, Official Action in Korean Patent Appln. No. 10-2006-7008977.

Netscape Communications Corp., Netcaster Developer's Guide, Netscape Communicator, Sep. 25, 1997 [112 pgs.].

Nilsson, B. A., and Robb, J., "Invasion of the Webcasters," PC World, vol. 15, No. 9 (Sep. 1997) p. 204-216 [9 pgs.].

PCT International Preliminary Report on Patentability, dated Jan. 9, 2008, for International Application No. PCT/US06/023386.

PCT International Search Report and Written Opinion dated Feb 9, 2007, for International Application No. PCT/US07/061944.

PCT International Search Report and Written Opinion dated Jul. 26, 2007, for International Application No. PCT/US06/025102.

PCT International Search Report and Written Opinion dated Jun. 28, 2006, for International Application No. PCT/US06/025103.

Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.

Otsuka, Shingo, et al. 2004. The Analysis of Users Behavior Using Global Web Access Logs. IPSJ SIG Technical Report, vol. 2004 No. 71 (Jul. 13, 2004), pp. 17-24.

ACM Portal USPTO Search, "Communications of the ACM: vol. 52, Issue 1", Association for Computing Machinery, dated Jan. 2009, 1 page.

Ad Close, Webpage [online]. C/net Downloads.com [retrieved on Oct. 4, 2001]. Retrieved from the Internet <URL http//download.cnet.com/downloads/0-10059-100-915154.html>.

Ad Muncher, Webpage [online]. C/net Downloads.com [retrieved on Oct. 4, 2001]. Retrieved from the Internet <URL:http//download.cnet.com/downloads/0-33567-18-100-2750044.html>.

AdDelete, Webpage [online]. C/net Download.com [retrieved on Oct. 4, 2001]. Retrieved from the Internet <URL:http//download.cnet.com/downloads/0-10059-100-7003126.html>.

Adextinguisher—Introduction and News Sections. Webpage [online][retrieved on Oct. 4, 2001]. Retrieved from the Internet URL:http//adext.magenet.net.html.

AdPurger, Webpage [online]. C/net Downloads.com [retrieved on Oct. 4, 2001]. Retrieved from the Internet <URL:http//download.cnet.com/downloads/0-10068-100-5067717.html>.

AdsOff, Webpage [online]. C/net Downloads.com [retrieved on Oct. 3, 2001]. Retrieved from the Internet <URL:http//download.cnet.com/downloads/0-10059-100-9 12651.html>.

AdSubract SE, Webpage [online]. C/net Downloads.com [retrieved on Oct. 4, 2001]. Retrieved from the Internet <URL:http//download.cnet.com/downloads/0-3356727-100-5963713.html>.

Advertising Killer, Webpage [online]. C/net Downloads.com [retrieved on Oct. 3, 2001]. Retrieved from the Internet <URL.http//download.cnet.com/downloads/0-10059-100-1539520.html>.

Advisory Action dated Nov. 19, 2008 issued in U.S. Appl. No. 11/015,583, 3 pages.

Aggarwal, Charu C. et al. 2001. Intelligent Crawling on the World Wide Web with Arbitrary Predicates. ACM, pp. 96-105.

AllGone, Webpage [online]. C/net Downloads.com [retrieved on Oct. 4, 2001]. Retrieved from the Internet <URL:http//download.cnet.com/downloads/0-10068-100-2915974.html>.

AnalogX Pow, Webpage [online]. C/net Downloads.com [retrieved on Oct. 3, 2001]. Retrieved from the Internet <URL:http//download.cnet.com/downloads-0-3356748-100-915372.html>.

Bae, Sung Min, et al., "Fuzzy Web Ad Selector", IEEE Intelligent Systems, vol. 18 Issue 6, Nov./Dec. 2003, pp. 62-69.

Banner Zapper, Webpage [online]. C/net Downloads.com [retrieved on Oct. 4, 2001]. Retrieved from the Internet <URL:http//download.cnet.com/downloads/0-3356727-100-6384611.html>.

BanPopup, Webpage [online]. C/net Downloads.com [retrieved on Oct. 4, 2001]. Retrieved from the Internet <URL:http//download.cnet.com/downloads/0-10059-100-6901908.html>.

Black List. Webpage [online]. C/net Downloads.com [retrieved on Oct. 4, 2001]. Retrieved from the Internet <URL.http/download cnet.com/downloads/0-10059-100-902347 html>.

Broder, Alan J., "Data Mining the Internet and Privacy", WEBKDD '99, LNAI 1836, Springer-Verlag, Berlin, Germany, (c) 2000, pp. 56-73.

Bucklin, Randolph E., et al., "Choice and the Internet: From Clickstream to Research Stream", Marketing Letters, vol. 13, No. 3, Aug. 2002, pp. 245-258.

Claria—Company Information—Corporate Review, webpage [online], retrieved on Mar. 3, 2005, retrieved from the internet: <URL:http://www.claria.com/companyinfo.html>.

Close Popup 4.0, Webpage [online]. Take A Hike Software [retrieved on Oct. 4, 2001]. Retrieved from the Internet <URL:http//www.ryanware.com/close_popup.html>.

Close Popup, Webpage [online]. C/net Downloads.com [retrieved on Oct. 4, 2001]. Retrieved from the Internet <URL:http//download.cnet.com/downloads/0-10059-100-905799.html>.

CobraSoft PopStop, Webpage (online). C/net Downloads.com [retrieved on Oct. 4, 2001]. Retrieved from the Internet <URL:http//download cnet.com/downloads/0-10058-100-6926765.html>.

Compare Prices and Read Reviews on AdsOff! Epenions.com. Webpage [online]; Jan. 21, 2001. Obtained from corresponding International Application PCT Search Report.

Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/en/index.html>.

CrushPop 2000, Webpage [online]. www.32bit.com [retrieved on Oct. 4, 2001]. Retrieved from the Internet <URL.http//32bit.com/software/listings/Internet/Special/180P/13794.html>.

Definition of "close button", Microsoft Press Computer Dictionary, 3rd ed. (Redmond WA: Microsoft Press, 1997).

Diligenti, Michelangelo et al. 2004. A Unified Probalistic Framework for Web Page Scoring Systems. IEEE, vol. 16, No. 1. Jan. 2004, pp. 4-16.

Directive 2002/58/EC of the European Parliament and of the Council of Jul. 12, 2002 concerning the processing of personal data and the protection of privacy in the electronic communications sector (Directive on privacy and electronic communications), Official Journal L 201, Jul. 31, 2002 p. 0037-0047 (downloaded.

DOGPILE, Dogpile Web Search Home Page, InfoSpace, Inc. 2004, p. 1 of 1, (retrieved on Apr. 1, 2004). Retrieved from the Internet: <URL:http://www.dogpile.com.html>.

DoubleClick products (17 total pgs); Webpage [online] [retrieved on Jun. 11, 2003]; Retrieved from the Internet: <URL:http://www.doubleclick.com>.

Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.

Favela, Jesus et al. 1997. Image-Retrieval Agent: Integrating Image Content and Text. IEE, vol. 1.14, pp. 36-39.

Fenstermacher, Kurt D., et al., "Client-Side Monitoring for Web Mining", Journal of the American Society for Information Science and Technology, vol. 54, Issue 7, May 2003, pp. 625-637.

Fenstermacher, Kurt D., et al., "Mining Client-Side Activity for Personalization", WECWIS 2002, (c) 2002, pp. 205-212.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Friedman, Batya, et al., "Informed Consent in the Mozilla Browser: Implementing Value-Sensitive Design", HICSS-35 '02, Jan. 2002, pp. 10-19.

Fu, Xiaobin, et al., "Mining Navigation History for Recommendation", IUI 2000, New Orleans, LA, (c) 2000, pp. 106-112.

Google search for "define: close button", Mar. 2, 2007.

Google Search, "Result Search Query Build Search Engine Index Using Gather Consumer Navigate Search", http://scholar.google.com/scholar, dated Apr. 7, 2010, 3 pages.

Gralla, Preston, How the Internet Works, Special Edition, Ziff-Davis Press, Emeryville, CA, (c) 1997, pp. 254 and 266-271.

Greening, Dan R., "Tracking Users: What Marketers Really Want to Know", Web Techniques, Jul. 1999, downloaded from: www.webtechniques.com/archives/1999/07/, pp. 1-9.

Heller, Laura, "Target gets mod in Manhattan", DSNRetailing Today, v40 n16, Aug. 20, 2001: 2, 37.

Hongyu Liu et al., "Focused Crawling by Learning HMM from User's Topic-Specific Browsing" Proceedings of the IEEE/WIC/ACM International Conference on Web Intelligence (WI '04) 0/7695-2100-2/04.

Hun, Ke et al. 2003. A Probabilistic Model for Intelligent Web Crawlers. IEEE, pp. 278-282.

InterMute, Webpage [online]. C/net Downloads.com [retrieved on Oct. 3, 2001]. Retrieved from the Internet <URL:http//download.cnet.com/downloads/0-10059-100-906599.html>.

International Search Report and Written Opinion of the International Search Authority for Intl. Appl. No. PCT/US05/45722 mailed Jan. 19, 2007.

International Search Report in EP Appln. No. 05802579.2-1527, dated May 2, 2008.

International Search Report in PCT Appln. No. PCT/US04/09918, mailed Mar. 10, 2005 [3 pages].

International Search Report in PCT Appln. No. PCT/US2004/07714, mailed Mar. 31, 2005 [1 page].

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

Ishitani, Lucila, et al., "Masks: Bringing Anonymity and Personalization Together", IEEE Security & Privacy, vol. 1, Issue 3, May/Jun. 2003, pp. 18-23.

Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.

Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.

Kourbatov, Opening a Window, Jul. 8, 2000, plubished by www.javascripter.net, whole document.

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May, 1999 (in Conf. Proc. 8th Int'l WWW Conf., Toronto, Canada, May 11-14, 1999).

Lee, Ching-Cheng, et al., "Category-Based Web Personalization System", COMPSAC 2001, Oct. 8-12, 2001, pp. 621-625.

Leuski, Anton et al. 2000. Lighthouse: Showing The Way To Relevant Information. IEEE, Oct. 2000, pp. 125-129.

Liu, Jian-Guo, et al., "Web Mining for Electronic Business Application", PDCAT 2003, Aug. 27-29, 2003, pp. 872-876.

Liu, Jian-Guo, et al., "Web Usage Mining for Electronic Business Applications", Machine Learning and Cybernetics, Shanghai, China, Aug. 2004, pp. 1314-1318.

Lu, Hongjun, et al., "Extending a Web Browser with Client-Side Mining", APWeb 2003, LNCS 2642, Springer-Verlag, Berlin, Germany, (c) 2003, pp. 166-177.

Luxenburger, Julia, et al., "Query-Log Based Authority Analysis for Web Information Search", WISE 2004, LNCS 3306, Springer-Verlag, Berlin, Germany, Nov. 1, 2004, pp. 90-101.

Marcebra Net, Webpage [online]. C/net Downloads.com [retrieved on Oct. 4, 2001]. Retrieved from the Internet <URL:http//download.cnet.com/downloads/0-3364666-100-5210875.html>.

Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.

Mobasher, Bamshad, et al., "Automatic Personalization Based on Web Usage Mining", Communications of the ACM, vol. 43, Issue 8, Aug. 2000, pp. 142-151.

Mr. KillAd. Webpage [online]. C/net Downloads.com [retrieved on Oct. 4, 2001]. Retrieved from the Internet <URL:http//download.cnet.com/downloads/0-10059-100-895339 html>.

Nagger, Webpage [online]. C/net Downloads.com [retrieved on Oct. 4, 2001]. Retrieved from the Internet <URL:http//download.cnet.com/downloads/0-3356748-100-2497932 html>.

NoAds 2000.6.30.1, Webpage [online] south bay software [retrieved on Oct. 4, 2001]. Retrieved from the Internet <URL:http//www.southbaypc.com/NoAds.html>.

Non-Final Rejection dated Dec. 20, 2006 issued in U.S. Appl. No. 11/015,583, 8 pages.

Non-Final Rejection dated Jul. 20, 2009 issued in U.S. Appl. No. 11/015,583, 7 pages.

NoPops 1.1, Webpage [online]. WebAttack.com [retrieved on Oct. 4, 2001]. Retrieved from the Internet <URL:http//www.webattack.com/get/nopops.shtml>.

Office Action mailed Oct. 10, 2007 from U.S. Appl. No. 11/207,590, filed Aug. 19, 2005.

Office Action mailed Sep. 13, 2006 from U.S. Appl. No. 10/700,820, filed Nov. 4, 2003.

Office Action mailed Oct. 16, 2008 from U.S. Appl. No. 11/207,590, filed Aug. 19, 2005.

Office Action mailed Sep. 16, 2004 from U.S. Appl. No. 10/056,932, filed Jan. 25, 2002.

Office Action mailed Mar. 18, 2005 from U.S. Appl. No. 10/056,932, filed Jan. 25, 2002.

Office Action mailed Jun. 22, 2009 from U.S. Appl. No. 11/207,590, filed Aug. 19, 2005.

Office Action mailed May 24, 2007 from U.S. Appl. No. 10/700,820, filed Nov. 4, 2003.

Office Action mailed Apr. 25, 2006 from U.S. Appl. No. 10/700,820, filed Nov. 4, 2003.

Office Action mailed Dec. 26, 2006 from U.S. Appl. No. 10/700,820, filed Nov. 4, 2003.

Office Action mailed Jul. 27, 2005 from U.S. Appl. No. 10/056,932, filed Jan. 25, 2002.

Office Action mailed Sep. 5, 2003 from U.S. Appl. No. 10/056,932, filed Jan. 25, 2002.

Office Action mailed May 7, 2004 from U.S. Appl. No. 10/056,932, filed Jan. 25, 2002.

Office Action mailed Oct. 19, 2007 from U.S. Appl. No. 11/207,589, filed Aug. 19, 2005.

Paepcke, Andreas, et al., "Beyond Document Similarity: Understanding Value-Based Search and Browsing Technologies", ACM SIGMOD Record, vol. 29, Issue 1, Mar. 2000, pp. 80-92.

Paganelli, Leila, et al., "Intelligent Analysis of User Interactions with Web Applications", IUI '02, San Francisco, CA, Jan. 13-16, 2002, pp. 111-118.

Paraben's AdStopper, Webpage [online]. C/net Downloads.com [retrieved on Oct. 4, 2001]. Retrieved from the Internet <URL:http//download.cnet.com/downloads/0-10059-100-2643648.html>.

Park, Joon S., et al., "Secure Cookies on the Web", IEEE Internet Computing, vol. 4, Issue 4, Jul./Aug. 2000, pp. 36-44.

Payton, D., et al. 1999. Dynamic collaborator discovery in information intensive environments. ACM Comput. Surv. 31, 2es, Article 8 (Jun. 1999), pp. 1-8.

PCT International Search Report for application No. PCT/US02/35981, 3 sheets; mailed Apr. 4, 2003.

PCT International Search Report for PCT/US03/13985 mailed Aug. 8, 2003; total of 1 sheet.

PCT International Search Report re: International Application No. PCT/US05/29615 dated Feb. 20, 2006.

Pierrakos, Dimitrios, et al., "Web Usage Mining as a Tool for Personalization: A Survey", User Modeling and User-Adapted Interaction, vol. 13, No. 4, (c) 2003, pp. 311-372.

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

Popki Popup Closer 1.4, Webpage [online]. WebAttack.com [retrieved on Oct. 4, 2001]. Retrieved from the Internet <URL:http//www.webattack.com/get/popki.shtml>.

PopKill, Webpage [online]. C/net Downloads.com [retrieved on Oct. 4, 2001]. Retrieved from the Internet <URL:http//download.cnet.com/downloads/0-10059-100-6967054.html>.

PopNot, Webpage [online]. C/net Downloads.com [retrieved on Oct. 4, 2001]. Retrieved from the Internet <URL http//download.cnet.com/downloads/0-10059-100-5112702.html>.

PopUp Eraser, Webpage [online]. C/net Downloads.com [retrieved on Oct. 4, 2001]. Retrieved from the Internet <URL:http//download.cnet.com/downloads/0-10059-100-6322841.html>.

Popup Hunter, Webpage [online]. C/net Downloads.com [retrieved on Oct. 4, 2001]. Retrieved from the Internet <URL:http//download.cnet.com/downloads/0-10059-100-1451171.html>.

PopUp Killer, Webpage [online]. C/net Downloads.com [retrieved on Oct. 3, 2001]. Retrieved from the Internet URL.http//download.cnet.com/downloads/0-10059-100-7253644 html>.

Popup Smasher, Webpage [online]. C/net Downloads.com [retrieved on Oct. 4, 2001]. Retrieved from the Internet <URL:http/download.cnet.com/downloads/0-3364664-100-7209048.html>.

Pop-up stopper, Webpage [online]. C/net Downloads.com [retrieved on Oct. 3, 2001]. Retrieved from the Internet <URL:http//download.cnet.com/downloads/0-10059-100-6803957.sub.—html&-gt;.

PopupDummy, Webpage [online]. C/net Downloads.com [retrieved on Oct. 4, 2001]. Retrieved from the Internet <URL:http//download.cnet.com/downloads/0-10059-100-6943327.html>.

Privacy and Electronic Communications (EC Directive) Regulations 2003 (PECR), No. 2426, Electronic Communication, Sep. 2003.

Ready, Kevin et al., "Plug-n-Play Java Script" (Indianapolis, IN: New Riders Publishing, 1996): 19-22, 39, 40 and 43-45.

Restriction Requirement dated Oct. 31, 2007 issued in U.S. Appl. No. 11/015,583, 6 pages.

Schonberg, Edith, et al., "Measuring Success", Communications of the ACM, vol. 43, Issue 8, Aug. 2000, pp. 53-57.

Shahabi, Cyrus, et al., "Efficient and Anonymous Web-Usage Mining for Web Personalization", INFORMS Journal on Computing, vol. 15, No. 2, Spring 2003, pp. 123-148.

Shopping with WhenUShop, Webpage [on-line]; WhenU.com [retrieved on Mar. 19, 2002]. Retrieved from the Internet: URL:http://www.whenu.com.

SideStep, The Traveler's Search Engine; Webpage (online) (retrieved on Oct. 7, 2004); retrieved from the Internet: <URL:http://www.sidestep.com/main.html.

Soumen Chakrabarti et al., "Focused Crawling: A New Approach to Top-Specific Web Resource Discovery" Computer Networks 31 (1999), pp. 1623-1640.

Srivastava, Jaideep, et al., "Web Usage Mining: Discovery and Applications of Usage Patterns from Web Data", SIGKDD Explorations, vol. 1. Issue 2, Jan. 2000, pp. 12-23.

Surf In Peace 2.01, Webpage [online]. WebAttack.com [retrieved on Oct. 4, 2001]. Retrieved from the Internet <URL:http//www.webattack.com/get/sip.shtml>.

U.S. Appl. No. 09/993,887, filed Nov. 27, 2001, by Jax B. Cowden, et al.

U.S. Appl. No. 09/993,904, filed Nov. 27, 2001, by Jax B. Cowden, et al.

U.S. Appl. No. 09/993,906, filed Nov. 27, 2001, by Jax B. Cowden, et al.

U.S. Appl. No. 11/207,590—Jul. 5, 2011 PTO Office Action.

U.S. Appl. No. 11/427,243—May 10, 2011 PTO Office Action.

Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.

Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.

U.S. Appl. No. 09/993,888, filed Nov. 27, 2001, by Mark E. Pennell, et al.

Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.

Web Magician, Webpage [online]. RocketDownLoad.com [retrieved on Oct. 4, 2001]. Retrieved from the Internet <URL:http/www.rocketdownload.com/Details/Inte/webmag.html>.

Wenyin, Liu, et al., "Ubiquitous Media Agents: A Framework for Managing Personally Accumulated Multimedia Files", Multimedia Systems, vol. 9, No. 2, Aug. 2003, pp. 144-156.

www.conversionruler.com/faq.php, Feb. 4, 2003.

Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.

Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.

Zero Popup, Webpage [online]. C/net Downloads.com [retrieved on Oct. 4, 2001]. Retrieved from the Internet <URL:http//download.cnet.com/downloads/0-3356748-100-7163307.html>.

* cited by examiner

Kepler - Create/Edit Alert - Amanda

Filter | Settings

Step 2  Set the Alert name.  Alert Name [Amanda]

Step 3  Select the Summarization level.  Summarize By [Message]

Step 4  Select the Alert field.  Alert Field [Impressions]

Step 5  Select the Alert threshold.  Alert When

● Alert Field Value Has  [10] %  Compared to [Decrease] [Rolling 7-day Average]

○ Alert Field Value  [Falls Below]  Within [Current Day]

Step 6  Select the Alert delivery format and addresses.

Format [Kepler]

Send alert to the following email addresses (separated by ; )

[Save]  [Cancel]

FIG. 8

DATABASE STRUCTURE AND FRONT END

BACKGROUND OF THE INVENTION

1. Field of the Invention

The present invention relates generally to databases, and more particularly, but not exclusively, to database structure and front ends.

2. Description of the Background Art

Large public computer networks, such as the Internet, allow advertisers to reach a worldwide audience twenty-four hours a day, seven days a week. This has made large public networks a cost-effective medium for marketing and selling products (e.g., goods and services). On the Internet, for example, advertising revenues allow companies to distribute free software or provide free access to websites. Needless to say, advertising helps fuel the Internet economy.

In order to provide relevant advertisements to consumers, companies engaged in online advertising maintain databases of advertising-related data. Such databases need to be accessed by sales and marketing personnel as they are the ones who typically plan and implement advertising campaigns. Unfortunately, some sales and marketing personnel are non-technical, and thus have difficulty working with the database. Front ends, which are application programs for interfacing with databases, may be provided to assist non-technical users in accessing the database. However, conventional front ends get harder to use as the number of selection choices for the database increases.

A database for storing online advertising-related data can grow very quickly because of the large number of consumers on the Internet. If a database is not structured properly, accessing the database may take longer as more data are stored in it. As a result, reports generated from the database may also take longer. This may discourage sales and marketing personnel from generating reports, and may keep some reports from being generated on time.

From the foregoing, an improved database structure and front end are generally desirable.

SUMMARY

In one embodiment, a method of analyzing online advertising information includes the steps of receiving consumer data from client computers, creating a database based on the consumer data, receiving user selected values from a front end, and extracting data from the database based on the user selected values. The front end may have a selection area with user selectable values that change depending on an initially selected value. In one embodiment, the database comprises an online analytical processing (OLAP) database.

These and other features of the present invention will be readily apparent to persons of ordinary skill in the art upon reading the entirety of this disclosure, which includes the accompanying drawings and claims.

DESCRIPTION OF THE DRAWINGS

FIG. 8 shows a screenshot of an example screen for an alerts.

The use of the same reference label in different drawings indicates the same or like components.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention are described herein in the context of advertising delivery over the Internet. It should be understood, however, that embodiments of the present invention may be generally employed to build databases and front ends for databases.

Embodiments of the present invention employ a message delivery program in communication with a message server. Message delivery programs and message servers are also disclosed in the following commonly-assigned disclosures, which are incorporated herein by reference in their entirety: U.S. application Ser. No. 10/152,204, filed on May 21, 2002, and U.S. application Ser. No. 10/289,123, filed on Nov. 5, 2002.

Figure 1:
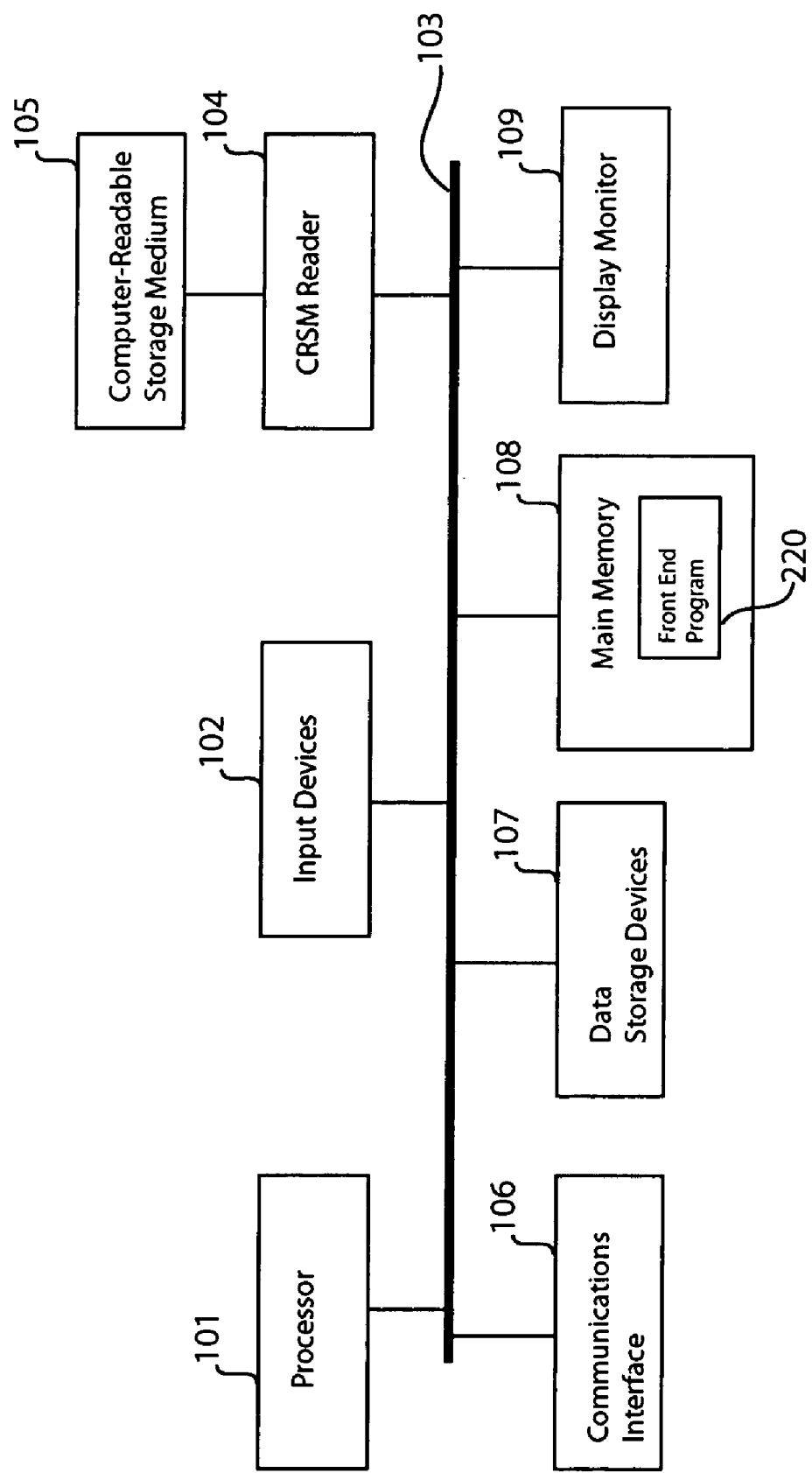
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one ore more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. In the example of FIG. 1, main memory 108 may be configured to include a front end program 220, which is further discussed below. A front end program 220 may be executed by processor 101.

Figure 2:
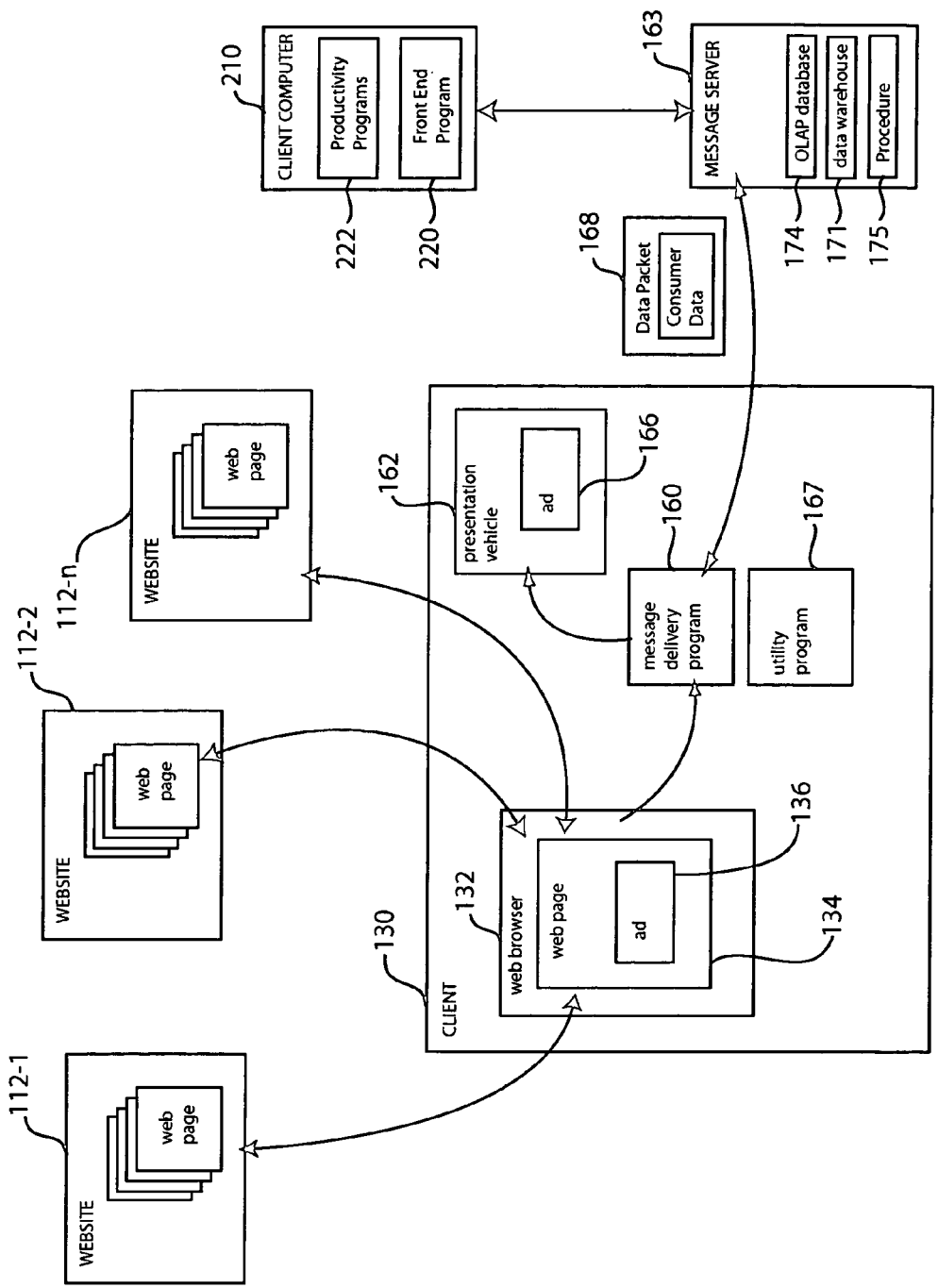
FIG. 2 shows a schematic diagram of a computing environment in accordance with an embodiment of the present invention.

FIG. 2 shows a schematic diagram of a computing environment in accordance with an embodiment of the present invention. In the example of FIG. 2, websites 112 (i.e., 112-1, 112-2, ...) comprise web servers accessible over the Internet. A website 112 may provide news, search engines, forums, audio and video streaming, e-mail service, and so on. A website 112 may provide information by way of web pages.

A client computer 130 may comprise a computer operated by a consumer navigating on the Internet. A client computer 130 may comprise a personal computer running the Microsoft Windows™ operating system, for example. Depending on the application, a client computer 130 may also be a portable or hand-held device, such as a laptop computer, a personal digital assistant, a digital mobile telephone, and so on. A client computer 130 may include a web browser 132 to allow a consumer to view web pages on websites on the Internet. A web browser 132 may be a commercially available web browser, such as the Microsoft Internet Explorer™ web browser. A web browser 132 allows a client computer 130 to receive one or more web pages from among available websites 112.

A client computer 130 may include a message delivery program 160. A message delivery program 160 may initiate the displaying of a presentation vehicle 162 to display an advertisement 166. Presentation vehicle 162 may be a browser window or a custom window. For example, presentation vehicle 162 may be a pop-up or a pop-under window. In one embodiment, a message delivery program 160 is downloadable from a message server computer 163.

A message delivery program 160 may be downloaded in conjunction with the downloading of another computer program. For example, a message delivery program 160 may be downloaded to a client computer 130 along with a utility program 167 that is provided to the consumer free of charge or at a reduced cost. A utility program 167 may be an e-wallet or an appointment calendar, for example. A utility program 167 may be provided to a consumer in exchange for the right to deliver advertisements to the consumer via a message delivery program 160. In essence, revenue from advertisements delivered to the consumer helps defray the cost of creating and maintaining the utility program 167.

In one embodiment, a message delivery program 160 is a client-side program that monitors the online activity of a consumer across several websites, and reports its observations to a message server 163. It is to be noted that the mechanics of monitoring a consumer's online activity, such as determining where a consumer is navigating to, what a consumer is typing on a web page, when a consumer activates a mouse or a keyboard, when a consumer clicks on an advertisement, and the like, is, in general, known in the art and not further described here. For example, a message delivery program 160 may listen for event notifications from a web browser 132 as part of its monitoring function. A message delivery program 160 may protect the consumer's privacy by maintaining the consumer's anonymity (e.g., by using a machine 1b to refer to the consumer) and encrypting sensitive information, such as credit card numbers.

In one embodiment, a message delivery program 160 monitors a web browser 132 for the uniform resource locator (URL) of websites visited by the consumer. A message delivery program 160 also keeps track of the number of impressions (i.e., displaying) of an advertisement 166 in the client computer 130, as well as the number of times the consumer clicked on an advertisement 166. A message delivery program 160 may periodically provide a data packet 168 containing its observations to a message server 163. Data provided by a message delivery program 160 to a message server 163 are also referred to as "consumer data." Consumer data thus include information on the websites visited by a consumer, URLs of web pages viewed by the consumer, the number of impressions of advertisements in the consumer's client computer, and the number of times the consumer clicked on advertisements.

A client-side program, such as a message delivery program 160, allows for web-wide monitoring of consumer online activities. Unlike a website, which can only monitor consumer behavior on the website or related websites, a message delivery program 160 can advantageously collect consumer data across multiple, un-related websites. Consumer data collected by a message server 163 from a large number of message delivery programs 160 are thus good indicators of consumer need, as well as the effectiveness of an advertising campaign.

A message server 163 may comprise a server computer in communication with a message delivery program 160. Note that a message server 163 typically works in conjunction with a plurality of client computers 130, each having a message delivery program 160; only one client computer 130 is shown in FIG. 2 for clarity of illustration. Message server 163 may include a data warehouse 171 for storing consumer data received from client computers 130. Data warehouse 171 may be a commercially available database, such as those of the type available from the Oracle Corporation of Redwood Shores, Calif. In one embodiment, a message server 163 includes an online analytical processing (OLAP) database 174, which may also be of the type available from the Oracle Corporation. An OLAP database 174 contains a subset of consumer data from a data warehouse 171, as well as advertising data, such as advertiser names, contracts with advertisers, advertising campaigns, and so on. As will be more apparent below, an OLAP database 174 may be structured to allow for the use of hierarchical tables that better organize advertising data and facilitate data access.

Still referring to FIG. 2, a message server 163 may include a procedure 175. In one embodiment, a procedure 175 comprises computer-readable program code for receiving dimensions and facts from a front end program 220, querying an OLAP database 174 based on the received dimensions and facts, filtering the result of the query based on the received dimensions, and providing the filtered result to the front end program 220. The terms "dimensions" and "facts," which are used herein in the context of an OLAP database cube, are further discussed below.

A client computer 210 may be in communication with a message server 163. In one embodiment, a client computer 210 comprises a personal computer running the Microsoft Windows™ operating system. A client computer 210 may include a front end program 220. A front end program 220 may comprise computer-readable program code for accepting dimensions and facts from a user, providing the dimensions and facts to a procedure 175, receiving a filtered result from the procedure 175, and presenting a corresponding report to the user. A front end program 220 may communicate with a procedure 175 using client-server protocol. A client computer 210 may also include productivity programs 222, such as the Microsoft Excel™ spreadsheet, Microsoft Power Point™ presentation program, Microsoft Word™ word processing program. A front end program 220 may be employed in conjunction with productivity programs 222 to display and analyze reports that are based on data extracted by a procedure 175 from an OLAP database 174.

Figure 3:
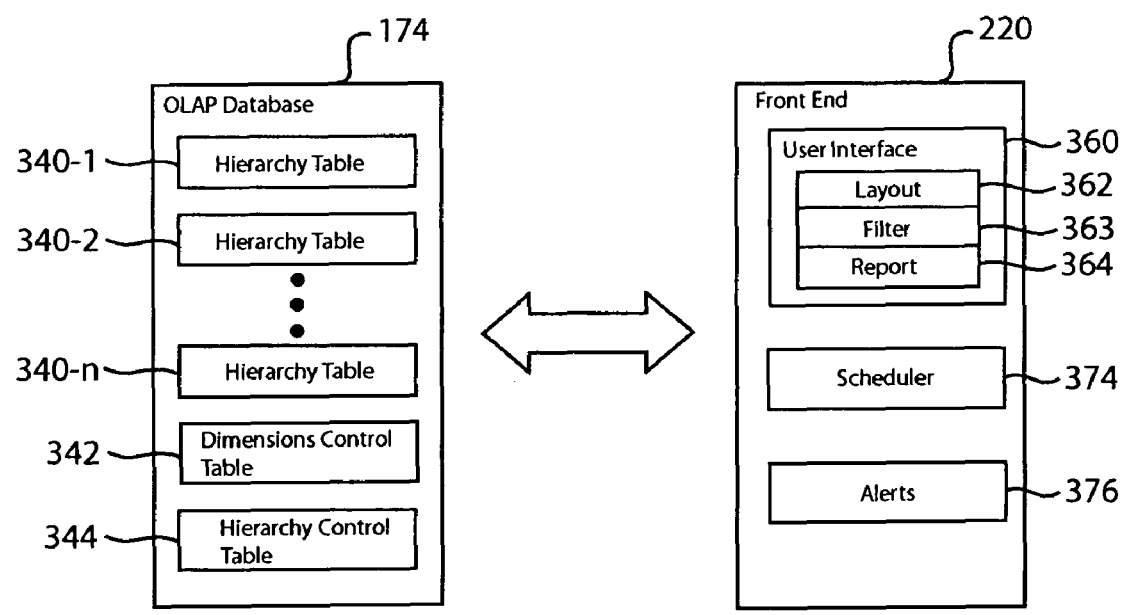
FIG. 3 shows a schematic diagram of an OLAP database and a front end program in accordance with an embodiment of the present invention.

Turning now to FIG. 3, there is shown a schematic diagram of an OLAP database 174 and a front end program 220 in accordance with an embodiment of the present invention. As shown in FIG. 3, an OLAP database 174 may comprise hierarchy tables 340 (i.e., 340-1, 340-2, . . . ), a dimensions control table 342, and a hierarchy control table 344. Hierarchy tables 340 may comprise a database table configured to have dimensions and facts, with each fact being associated with a single dimension or combination of dimensions. Hierarchy tables 340 are arranged in a hierarchical topology, with the lowest level hierarchy table 340 having the most number of dimensions, the next higher level hierarchy table 340 having less dimensions than the lowest hierarchy table 340, the next higher level hierarchy table 340 having less dimensions than the next hierarchy table 340, and so on. That is, the hierarchy tables 340 may be configured as follows:

(1) First level (lowest level) hierarchy table:
Dimension$_1$, Dimension$_2$, . . . Dimension$_n$; Fact$_1$, Fact$_2$, . . . Fact$_k$.
(2) Second level hierarchy table:
Dimension$_1$, Dimension$_2$, . . . Dimension$_{n-1}$; Fact$_1$, Fact$_2$, . . . Fact$_k$.
(3) Third level hierarchy table:
Dimension$_1$, Dimension$_2$, . . . Dimension$_{n-2}$; Fact$_1$, Fact$_2$, . . . Fact$_k$ and so on. Note that a second level hierarchy table may have one less dimension than the first level hierarchy table, while a third level hierarchy table may have one less dimension than the second level hierarchy table. Further note that the number of facts in each hierarchy table does not necessarily have to be different.

The hierarchical levels allow for faster data access in a level "n" compared to a level "n−1". That is, data can be accessed faster in the higher levels. The idea is to minimize the number of rows by eliminating dimensions successively. The elimination of dimensions results in smaller tables, which results in faster data access.

In one embodiment, the dimensions and facts in hierarchy tables 340 relate to online advertising. The dimensions may include advertisements, campaigns, contracts, and other advertising data. As a further example, each advertisement may belong to one or more advertising campaigns, with each advertising campaign being associated with one or more contracts, and so on. The facts may include impressions (i.e., displaying of an advertisement) and clicks on impressions. Thus, for each particular value of advertisement, campaigns, contracts, or combinations thereof there may be a corresponding impressions value and clicks value. For example, a particular advertisement for a particular advertising campaign may have 2,000 impressions. As another example, a particular advertising campaign with an associated contract may have resulted in 4,000 impressions and 1,000 clicks on the impressions. Of course, the number and type of dimensions and facts, and their corresponding values, may vary to meet the needs of specific applications.

Each hierarchy table 340 may be structured to have the facts for a particular combination of dimensions. As a particular example, assuming an exhaustive list of dimensions consists of advertisement, advertising campaign, and contract, a first (lowest) level hierarchy table 340 will include facts (e.g., impressions, clicks, or both) for the dimensions advertisement, advertising campaign, contract, or combinations thereof; a second level hierarchy table 340 will include facts for the dimensions advertisement, advertising campaign, or combinations thereof; and so on. That is, for a particular number of dimensions, there will be a hierarchy table 340 with the corresponding facts. In one embodiment, hierarchy tables 340 are manually populated using data from a data warehouse 171. Hierarchy tables 340 may also be populated using a script, for example. As can be appreciated, extracting data from a hierarchy table is generally faster than extracting data from an entire database. Hierarchy tables 340 thus provide a database structure that advantageously allows for relatively fast data access. We need to communicate that the front end is "thought" about the exhaustive list of all dimensions and facts, the relationship between each dimension (i.e. the hierarchy), the table names of each level of aggregation and the dimensions available in each aggregate table, the type of each dimension i.e. free form, tree or list box by using control tables.

In one embodiment, a dimension in an OLAP database 174 may be one of three kinds of dimensions namely, "pull-down," "tree," or "free-form." A pull-down dimension may have a value that is selectable from a pull-down menu. For example, assuming "advertisement" is a pull-down dimension, the values "Ad1" for a first advertisement or "Ad2" for a second advertisement may be selected in a pull-down menu for "advertisement." A tree dimension may have a value that is selectable from a hierarchical tree structure. For example, assuming "category" is a tree dimension, the values "automotive" for web pages relating to automotives or "travel" for travel-related web pages may be selected in a tree structure for "category." In the tree structure, the value "hotel" may be included as branching off the value "travel." A free-form dimension may have a value that may entered without choosing from available selections. For example, assuming "revenue" is a free-form dimension, a user may enter any revenue amount for "revenue."

As shown in FIG. 3, an OLAP database 174 may include a dimensions control table 342. A dimensions control table 342 may comprise an exhaustive list of all dimensions and facts in all hierarchy tables 340, templates for constructing queries for each dimension, and a dimension look-up table. The dimension look-up table is employed in embodiments where the hierarchy tables 340 refer to dimensions using identifiers other than the dimensions' actual names (e.g., using "d2345" in a hierarchy table 340 to refer to a dimension "advertisement"). The dimension look-up table allows for translation of an identifier to actual name, and vice versa. A dimensions control table 342 may also have information on the kind of each dimension (e.g., whether a dimension is a pull-down, tree, or free-form) and conditional operators that may be used for a particular dimension.

An OLAP database 174 may also include a hierarchy control table 344. A hierarchy control table 344 may comprise information indicative of the data structure of the OLAP database 174. In one embodiment, a hierarchy control table 344 identifies each hierarchy table 340, the hierarchical order of the hierarchy tables 340, and the dimensions included in each hierarchy table 340. A hierarchy control table 344 may thus be consulted to identify the highest level hierarchy table 340 containing a particular set of dimensions and filters. Note that the highest level hierarchy table containing a particular set of dimensions and filters would advantageously have the least number of rows among hierarchy tables that also contain the set of dimensions and filters.

The general role of the front end is to optimally obtain that slice of the OLAP cube that contains all the data that the user is interested in viewing and displaying that slice of the OLAP cube in exactly the format that the user wishes to view. The filter page allows the user to slice the OLAP cube using criteria on the dimensions. The layout page allows the user to specify the format of the report.

Still referring to FIG. 3, a front end program 220 may comprise a user interface 360, a scheduler 374, and an alerts 376. In one embodiment, a front end program 220 is implemented using the Microsoft Visual Basic For Applications™ (VBA) programming language. A user interface 360 may comprise computer-readable program code for allowing a user to enter selection criteria and generate a report in accordance with the selection criteria. The selection criteria may be values for dimensions and facts. A user interface 360 may comprise a layout screen 362, a filter screen 363, and a report screen 364.

Figure 4:
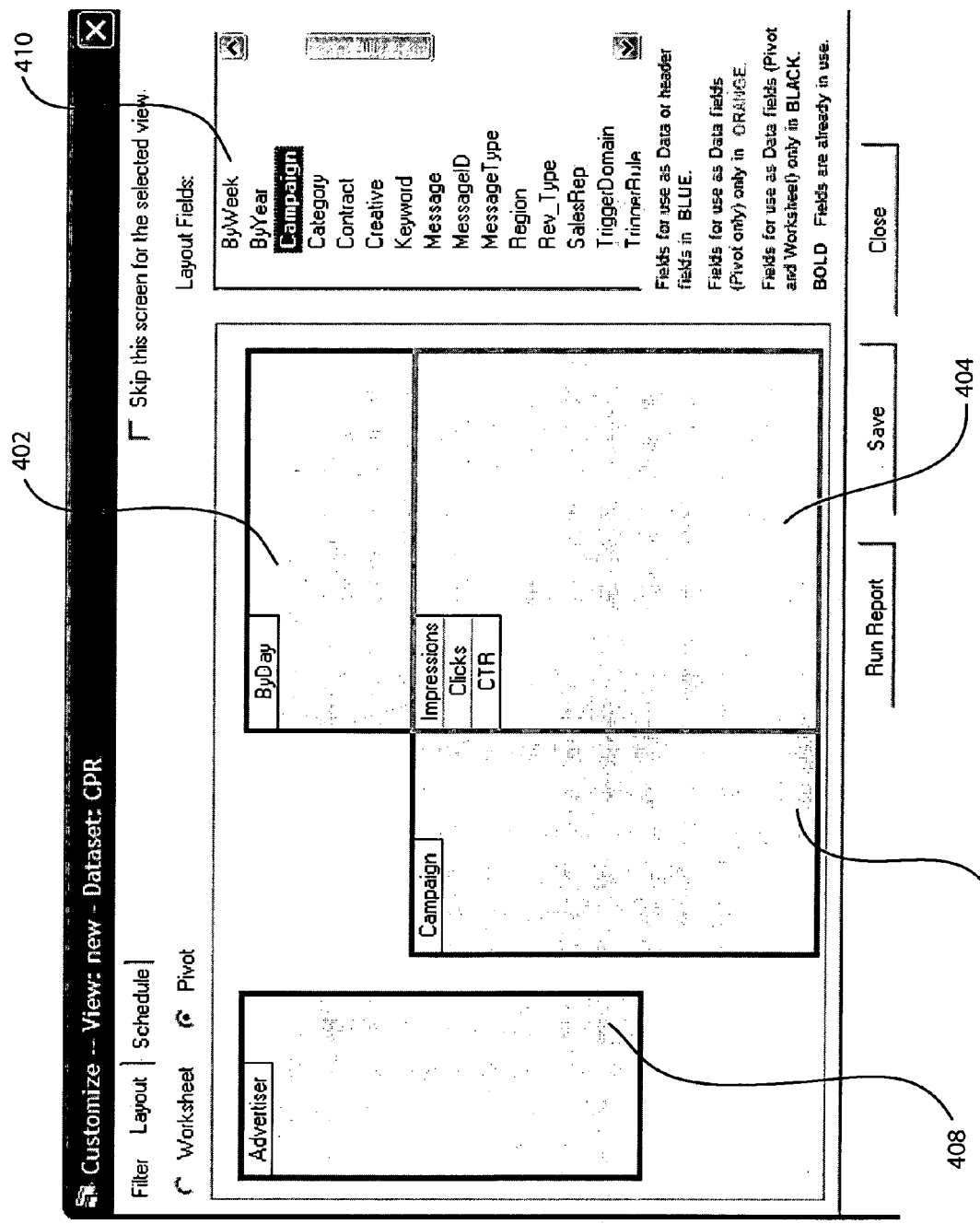
FIG. 4 shows a screenshot of an example layout screen in accordance with an embodiment of the present invention.

A layout screen 362 allows a user to select dimensions and facts of interest. The selected dimensions and facts will be the basis of a subsequently run report. Generally speaking, a layout screen 362 allows the user to specify the format of the report. FIG. 4 shows a screenshot of an example layout screen 362 in accordance with an embodiment of the present invention. In the example of FIG. 4, an exhaustive list of all available dimensions and facts in hierarchy tables 340 is displayed in a window 410. The user may select one or more available dimensions and facts from the window 410 for inclusion in selection areas 402, 404, 406, and 408. In the example of FIG. 4, selection areas 402, 406, and 408 only accept one or more dimensions, while selection area 404 only accepts facts. User interface 360 enforces the rules on which item in window 410 can be placed in which selection area (i.e., dimensions can only go to selection areas 402, 406, and 408; facts can only go to selection area 404). In accordance with standard OLAP terminology, dimensions in selection area 402 are also referred to as "column edge dimensions," dimensions in selection area 406 are also referred to as "row edge dimensions," and dimensions in selection area 408 are also referred to as "page edge dimensions." In the example of FIG. 4, the user has selected "ByDay" as a column edge dimension, "campaign" as a row edge dimension, "advertiser" as a page edge dimension, and "impressions," "clicks", and "CTR" as facts. "CTR" stands for click-through-rate, and is a calculated fact obtained by dividing the number of impressions with the number of clicks. Click-through-rate is a measure of the effectiveness of an advertisement. User interface 360 may also employ visual cues to assist users in working with items in window 410.

Figure 5:
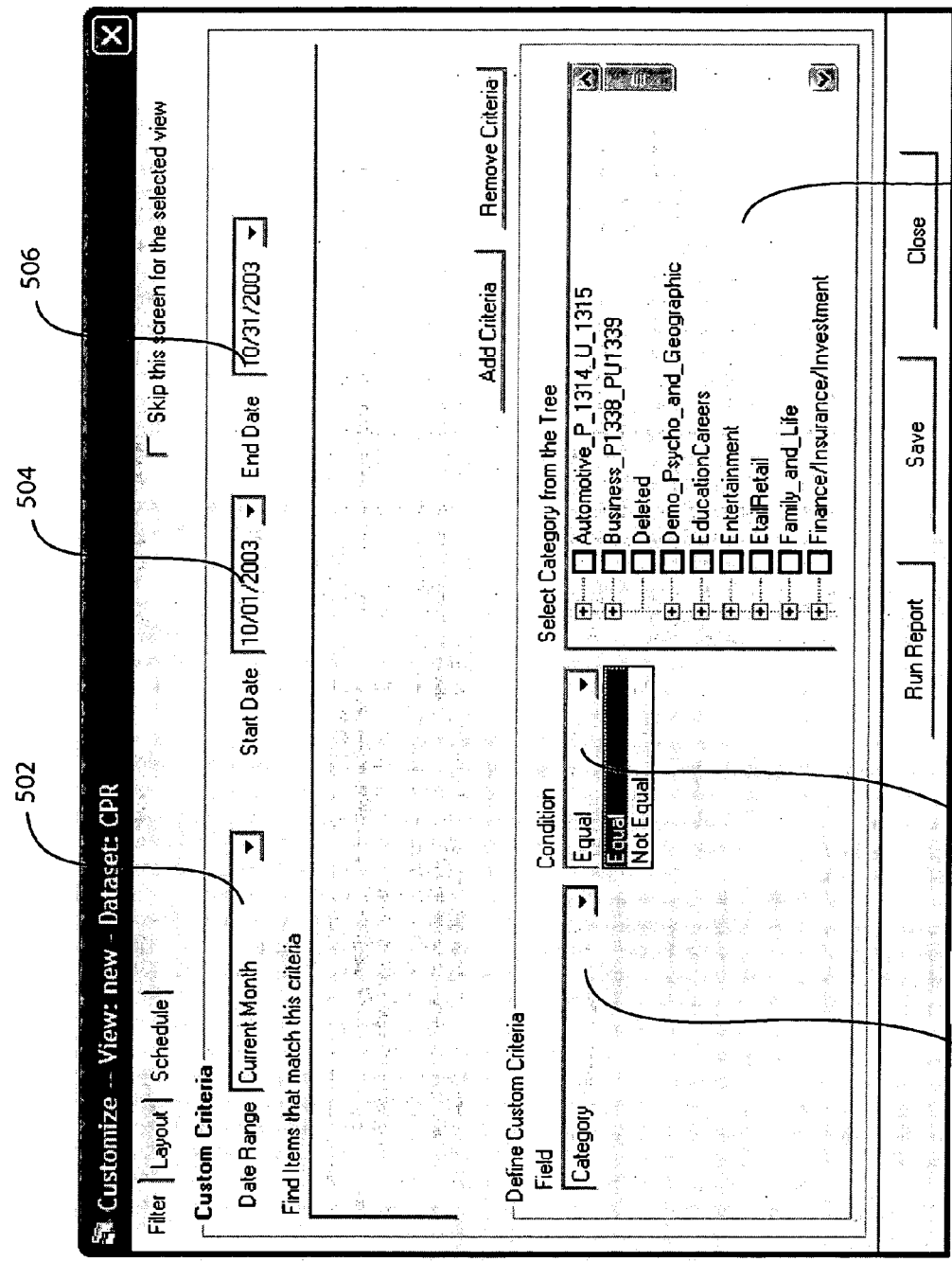
FIG. 5 shows a screenshot of an example filter screen in accordance with an embodiment of the present invention.

A filter screen 363 accepts dimensions that will be used as filters to the dimensions and facts selected in a layout screen 362. The general role of a front end program 220 is to optimally obtain that slice of an OLAP cube that contains all the data that the user is interested in viewing, and displaying that slice of the OLAP cube in exactly the format that the user wishes to view. In that regard, a filter screen 363 allows the user to slice the OLAP cube using filters on the dimensions. FIG. 5 shows a screenshot of an example filter screen 363 in accordance with an embodiment of the present invention. In the example of FIG. 5, selection areas 502, 504, 506, 508, 510, and 512 are table-driven in that they accept dimensions that are selectable based on information from control tables in the OLAP database 174. For example, once the user selects a dimension for selection area 508, a front end program 220 may consult a dimensions control table 342 to determine the kind of the selected dimension and the conditional operators that may be used for the selected dimension. The front end program 220 may consult a hierarchy control table 344 to determine which hierarchy table 340 to use and to perform translations between the identifier and actual name of a dimension. Dimensions that serve as possible values for the selected dimension are then displayed by a user interface 360 in selection area 512. In the example of FIG. 5, the user is requesting a report for the dimensions specified in a layout screen 362, but limited to a "category" that is "equal" to a category selected from "Automative," "Business," ... etc. The user is further limiting the report to the "current month" between "Oct. 1, 2003" and "Oct. 31, 2003." Note that once the user selects a "date range," the selectable values for "start date" and "end date" will be set based on the data available from the OLAP database 174. Similarly, once the user selects "category" in selection area 508, the conditional operators to choose from in selection area 510 and the categories to choose from in selection area 512 are set based on data in the OLAP database 174. As can be appreciated, this advantageously allows addition of more dimensions in the OLAP database 174 without necessarily having to increase the number of selection windows in the user interface 360.

In one embodiment, a front end program 220 has minimal processing load to allow it to adapt to a changing OLAP database 174 and to allow it to be more portable to other databases. Accordingly, in one embodiment, a front end program 220 works in a client-server relationship with an OLAP database 174 and is driven by tables in the OLAP database 174. This advantageously obviates the need for hard coding of available dimensions in the front end program 220 and offloads the processing burden to the OLAP database 174 (which may be running in a relatively fast server computer). For example, the front end program 220 may receive a dimensions control table 342 and display the exhaustive list of dimensions and facts in the dimensions control table 342 in window 410 (see FIG. 4).

As a further example, the values selectable from selection areas 510 and 512 are based on a value selected by a user in selection area 508 (see FIG. 5). The valid values to be displayed in selection areas 510 and 512 may be determined from a dimensions control table 342 and a hierarchy control table 344.

A front end program that offloads the majority of processing to a server computer is especially important in online advertising. Unlike in mail order or catalog advertising applications, advertisement delivery over the Internet is essentially free in that an advertiser can send additional advertisements without incurring substantial additional cost. This results in a relatively large volume of impression data. A front end program 220 advantageously allows a client computer to access large amounts of data by using a back end server to do the "heavy lifting." This will have the desirable effect of scalability by essentially scaling the back end as opposed to being reliant on client computer resources (which in many ways are outside the control of the programmer). This also allows for robust programming and the ability to retrieve data even with relatively old or low capacity client computers.

Figure 6:
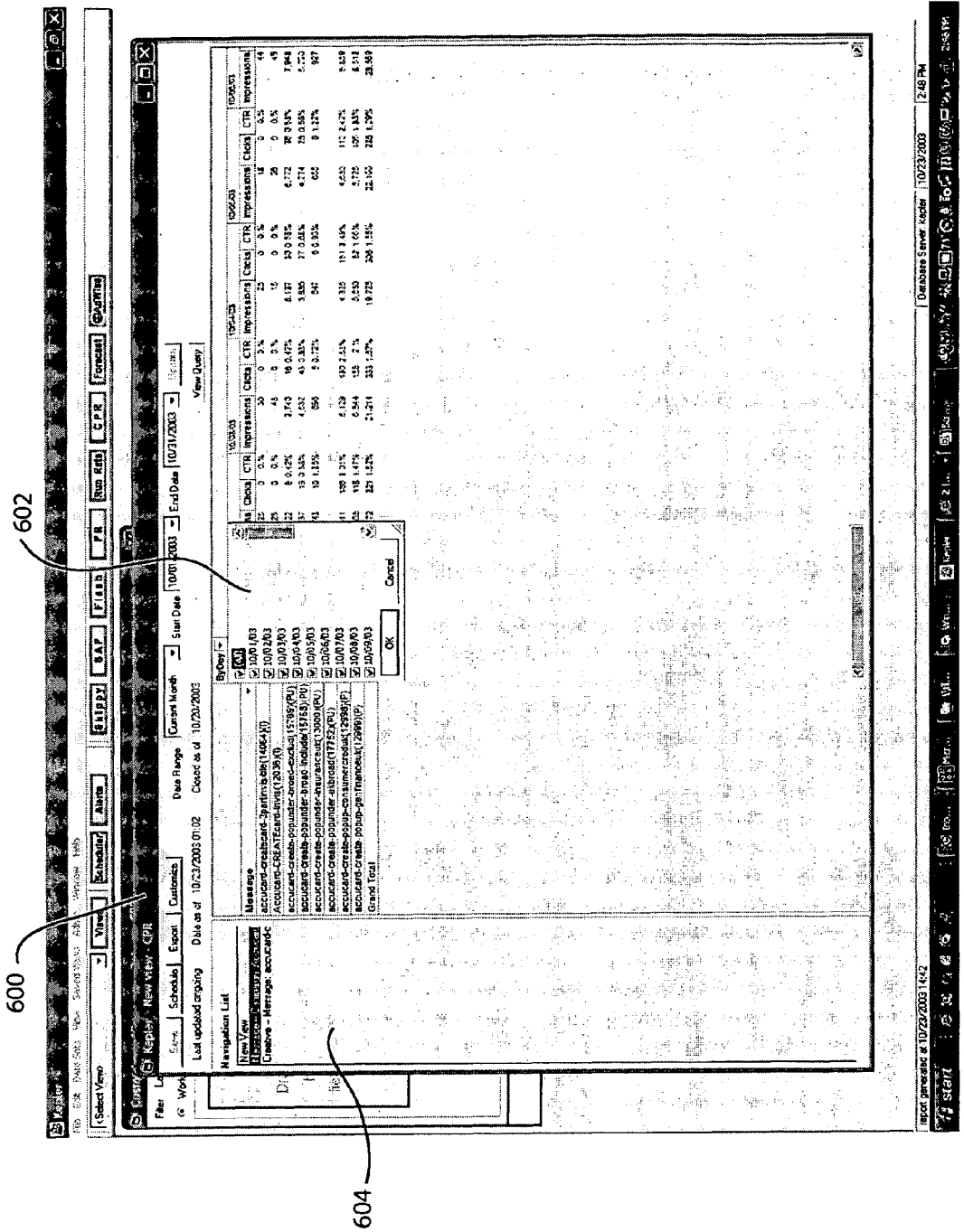
FIG. 6 shows a screenshot of an example report displayed in a report screen in accordance with an embodiment of the present invention.

A report screen 364 provides a report based on the dimensions and facts selected by a user in a layout screen 362 as filtered by the dimensions the user selected in a filter screen 363. A front end program 220 may provide the selected dimensions and facts to a procedure 175 in a message server 163 (see FIG. 2). The procedure 175 may then query an OLAP database 174, filter the result of the query using the dimensions selected in the filter screen 363, and provide the result to the front end program 220. The result may be viewed in a report screen 364. FIG. 6 shows a screenshot of an example report 600 displayed in a report screen 364 in accordance with an embodiment of the present invention. In the example of FIG. 6, the report screen 364 shows the impressions, clicks, and CTR for the advertiser "Accucard." A user may select a different view of the report by selecting another view in the navigation window 604. The dimensions and facts for a report may be saved as a "view." As will be further explained below, save views may be rerun to take advantage of new data in an OLAP database 174. The dimensions for the report may be further configured by specifying new dimensions. An OLAP database 174 may have to be re-queried if the saved view does not include the data for the new dimensions, or if the user elects to rerun the view.

In the example of FIG. 6, new values for the dimension "ByDay" may be selected from a pull-down menu 602. A report may also be pivoted to show a different view. For example, a report may be pivoted by replacing one dimension with another.

Figure 7:
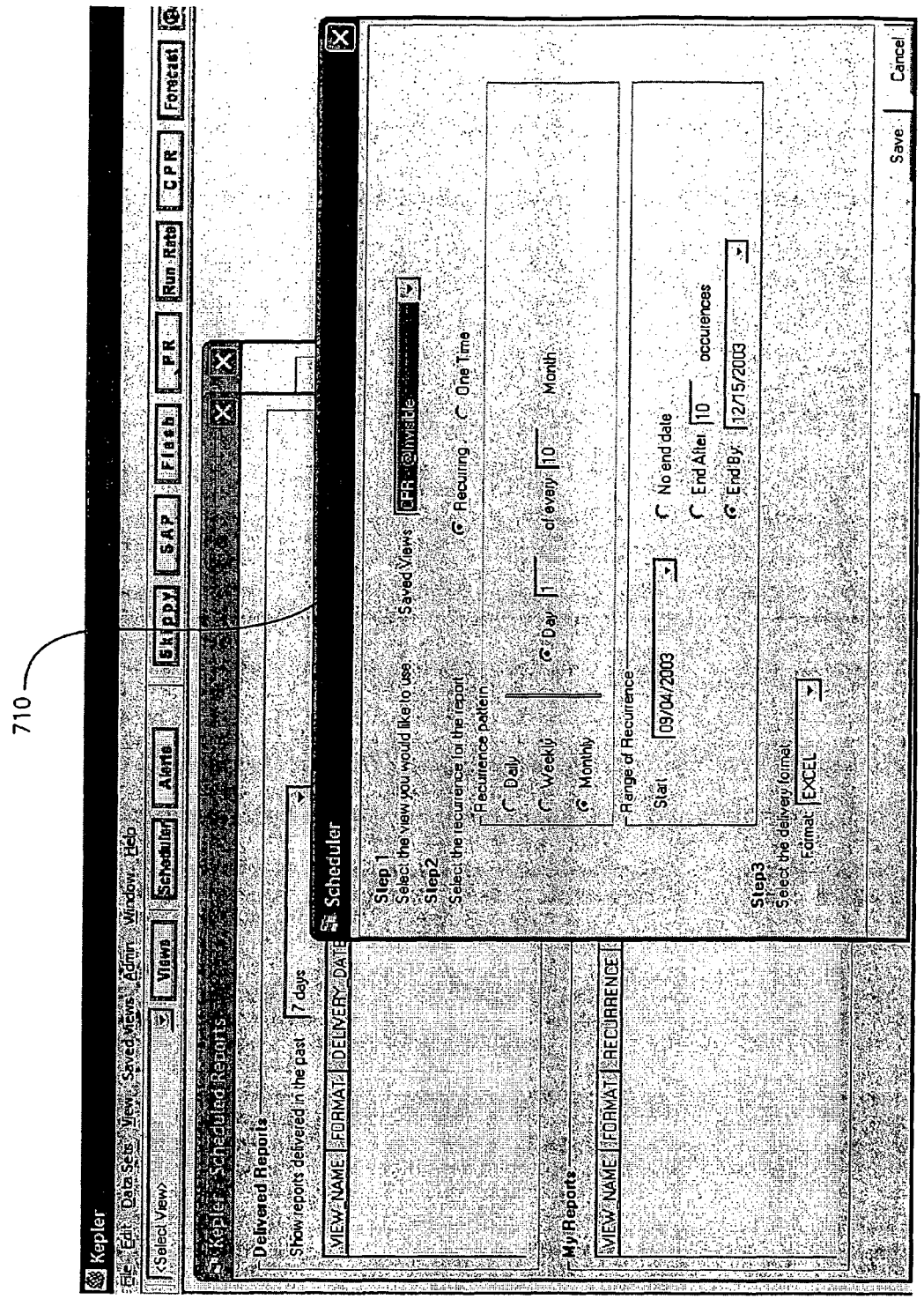
FIG. 7 shows a screenshot of an example screen for a scheduler.

A scheduler 374 may comprise computer-readable program code for scheduling report generation. Scheduler 374 may run reports based on a previously saved view, which comprise dimensions and facts selected by a user in a layout screen 362 and a filter screen 363. A scheduler 374 may be configured to generate a report at a certain frequency, for a certain period of time. A scheduler 374 may also be configured to save the generated reports in a format supported by productivity programs 222 (e.g., saved in Excel format), and email the generated report to the user. The mechanics of converting data formats and emailing are, in general, known in the art and not further described here. FIG. 7 shows a screenshot of an example screen 710 for a scheduler 374.

An alerts 376 may comprise computer-readable program code for alerting a user about changes in the data stored in an OLAP database 174. An alerts 376 may run a report based on dimensions and facts selected by a user in a layout screen 362 as filtered by dimensions the user selected in a filter screen 363. Thereafter, the alerts 376 may compare the generated report to the alert conditions specified by the user. If the result meets the alert conditions, the alerts 376 may so inform the user. FIG. 8 shows a screenshot of an example screen for an alerts 376. In the example of FIG. 8, the user has requested to be alerted in the event the number of impressions for a specified set of dimensions (not shown) have decreased by 10% in a rolling 7-day average. As can be appreciated, an alerts 376 may be employed to automatically watch for trends.

Figure 9:
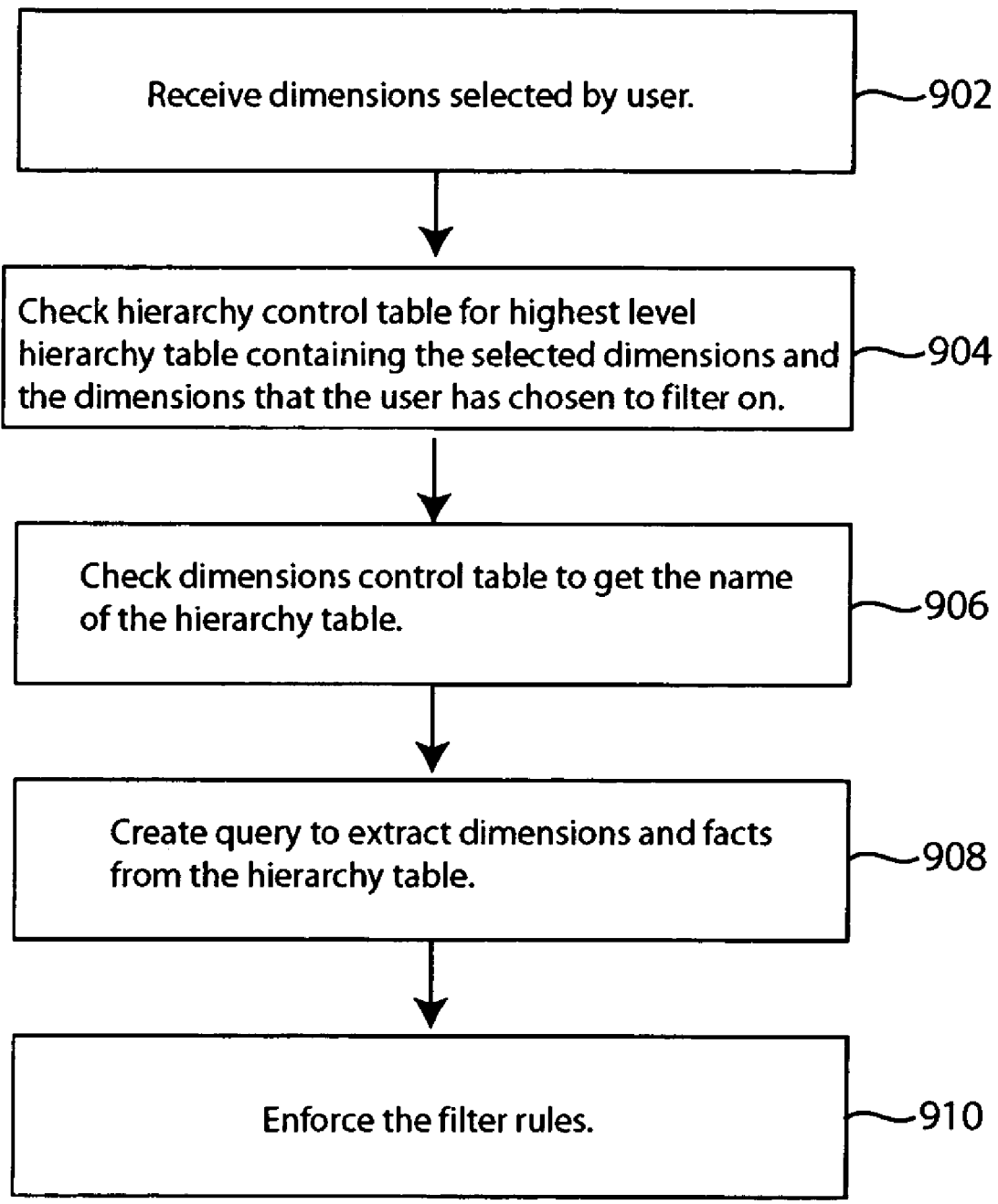
FIG. 9 shows a flow diagram of a method of generating a report in accordance with an embodiment of the present invention.

Turning to FIG. 9, there is shown a flow diagram of a method of generating a report in accordance with an embodiment of the present invention. In step 902, a procedure for an OLAP database receives dimensions selected by a user. The dimensions may relate to online advertising. The dimensions may be selected by making selections or entering values in a front end program for the OLAP database.

In step 904, the procedure checks a hierarchy control table for the highest level hierarchy table (referred to as "relevant hierarchy table") containing all of the selected dimensions. In step 906, the procedure may consult a dimensions control table to get the name of the relevant hierarchy table. In step 908, the procedure creates a query to extract dimensions and facts from the hierarchy table. A general algorithm to construct a SQL query is shown in Table 1:

TABLE 1

1) Construct a where clause using the filters set.
   a. Convert each of the filter elements into Ids (identifications) using the lookup tables. In the aggregate tables, the filter values are stored as Ids. This allows for a compact storage of long descriptive names. Hence the query string for the OLAP table itself has to be constructed using Ids rather than the descriptive elements that the user sets in the filter.
   b. Construct a where clause with the converted filter ID values
      i. Use the OR condition to choose for ID values within each line
      ii. Use the AND condition to choose across different dimensions e.g. (dim1 = value1 or dim1 = value2) and (dim2 = value3 or dim3 = value4)
2) Construct the select statement using the dimensions and facts in the layout
3) Construct the group by statement using the dimensions in the layout
4) Construct the order by statement using the default sort order for each dimension in the layout. The default sort order is stored in the dimension lookup table.
5) Construct the from statement using the table name that contains the highest level of aggregation that contains all the dimensions and facts that are called for in the filters and in the layout.

In step 910, the procedure may enforce filter rules on the result of the query. The filter rules may be based on dimensions selected by the user in a filter screen of the front end program. In one embodiment, the result of a query is filtered by applying a "where condition" and a "select statement." The "where condition" may specify the data to be extracted from the relevant hierarchy table. For example, the pseudo code:
   select from "relevant_hierarchy_table";
   where advertiser=5 and messagetype=7;
extracts facts for the dimension advertiser with a value of "5" ("5" may refer to a specific advertiser, such as Vendor, Inc.) and the dimension message_type with a value of "7" (again, "7" may refer to a specific message type, such as a pop-up) from the relevant hierarchy table.

The procedure may forward the filtered result of the OLAP database query to the front end program, which then formats the result for presentation to the user as a report.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of analyzing online advertising information, the method comprising:

receiving consumer data from a plurality of client computers;

creating, in a computer, a database based on the consumer data, wherein the database comprises a plurality of hierarchy tables configured to store at least some of the consumer data, each hierarchy table comprising at least one fact associated with at least one dimension, wherein the plurality of hierarchy tables are arranged such that at least one of the plurality of hierarchy tables has a highest number of dimensions and a second of the plurality of hierarchy tables has a lowest number of dimensions;

receiving user selected values from a front end, the front end having an interface displaying a selection area with user selectable values that change depending on an initially selected value;

extracting data from the plurality of hierarchy tables within the database based on the user selected values;

receiving alert conditions from a user using the front end, the alert conditions comprising dimensions and facts; and alerting the user when the consumer data meets the alert conditions.

2. The method of claim 1 wherein the consumer data comprises a number of impressions of an advertisement.

3. The method of claim 1 wherein the consumer data comprises a number of clicks on an advertisement.

4. The method of claim 1 wherein the database comprises an online analytical processing (OLAP) database.

5. A computer-readable storage medium comprising code, the code executable by a processor to perform a method, the method comprising:

executing a front end for a database, the database comprising a plurality of hierarchy tables, wherein the plurality of hierarchy tables are arranged in a hierarchy topology with a lowest level hierarchy table of the plurality of hierarchy tables comprising facts associated with a highest number of dimensions and a highest level hierarchy table of the plurality of hierarchy tables comprising facts associated with a single dimension;

displaying an interface of the front end, the interface comprising:

a first selection area for selecting a first value from a first set of values; and a second area for selecting a second value from a second set of values, the second set of values being automatically displayed by the front end in the second selection area based on the first value, wherein the first and second values refer to a first dimension associated with at least one hierarchy table of the plurality of hierarchy tables within the a database;

receiving alert conditions from a user using the front end, the alert conditions comprising dimensions and facts; and alerting the user when consumer data in the database meets the alert conditions.

6. The front end of claim 5 wherein the database comprises an online analytical processing (OLAP) database.

7. The front end of claim 5 wherein the first set of values are obtained from the at least one hierarchy table of an online analytical processing (OLAP) database.

8. The front end of claim 5 wherein the first set of values and the second set of values comprise at least one dimension of an online analytical processing (OLAP) database.

9. The front end of claim 5 wherein the database comprises consumer data collected by a client program in a client computer.

10. The front end of claim 9 wherein the consumer data comprise a number of impressions of an advertisement.

11. The front end of claim 9 wherein the consumer data comprises a number of mouse clicks on an advertisement.

12. A method of generating a report, the method comprising:

receiving, in a computer, a plurality of selected dimensions of a database from a front end, the front end having an interface displaying selection areas that are driven by a plurality of hierarchy tables of the database, wherein the plurality of hierarchy tables are arranged in a hierarchy topology with a lowest level hierarchy table of the plurality of hierarchy tables comprising facts associated with a highest number of dimensions and a highest level hierarchy table of the plurality of hierarchy tables comprising facts associated with a single dimension;

determining a first hierarchy table among the plurality of hierarchy tables of the database, the first hierarchy table comprising facts associated with all of the selected dimensions;

extracting data from the first hierarchy table to generate extracted data;

filtering the extracted data using filter parameters received from the front end to generate filtered data;

providing the filtered data to a client computer running the front end;

receiving alert conditions from a user using the front end, the alert conditions comprising dimensions and facts; and alerting the user when consumer data in the database meets the alert conditions.

13. The method of claim 12 wherein filtering the extracted data includes performing conditional operations on the extracted data.

14. The method of claim 12 wherein the first hierarchy table includes data obtained from client programs monitoring a consumer online activity.

15. The method of claim 14 wherein the consumer online activity includes clicking on an advertisement.

16. The method of claim 12 wherein each of the plurality of hierarchy tables contains at least one dimension related to online advertising.

17. The method of claim 12 wherein the first hierarchy table includes a fact relating to a number of impressions of an advertisement.

18. The method of claim 12 wherein the first hierarchy table includes a fact relating to a number of clicks on an advertisement.

19. The method of claim 12 further comprising displaying at least some of the filtered data on the client computer.

* * * * *

UNITED STATES PATENT AND TRADEMARK OFFICE
CERTIFICATE OF CORRECTION

PATENT NO. : 8,170,912 B2  
APPLICATION NO. : 10/721117  
DATED : May 1, 2012  
INVENTOR(S) : Bennett et al.

Page 1 of 1

It is certified that error appears in the above-identified patent and that said Letters Patent is hereby corrected as shown below:

On Page 6, in item (56), under "OTHER PUBLICATIONS", in Column 1, Line 7, delete "plublished" and insert -- published --, therefor.

On Page 6, in item (56), under "OTHER PUBLICATIONS", in Column 1, Line 13, delete "Toronta," and insert -- Toronto, --, therefor.

In Column 1, Line 58, delete "DESCRIPTION" and insert -- BRIEF DESCRIPTION --, therefor.

In Column 4, Line 1, delete "1b" and insert -- ID --, therefor.

In Column 10, Line 36, delete "messagetype=7;" and insert -- message_type=7; --, therefor.

In Column 10, Line 40, delete "message type," and insert -- message_type, --, therefor.

In Column 11, Line 36, in Claim 5, delete "the a" and insert -- the --, therefor.

Signed and Sealed this  
Twentieth Day of November, 2012

David J. Kappos  
*Director of the United States Patent and Trademark Office*